United States Patent
Ming et al.

(10) Patent No.: US 8,300,289 B2
(45) Date of Patent: Oct. 30, 2012

(54) METHOD FOR COMPENSATING FOR COLOR VARIATIONS ACROSS A PRINTED PAGE USING MULTIPLE-PASS PRINTING

(75) Inventors: Wei Ming, Cupertino, CA (US); Hiroshi Tomita, Irvine, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 927 days.

(21) Appl. No.: 11/864,487

(22) Filed: Sep. 28, 2007

(65) Prior Publication Data

US 2009/0086273 A1    Apr. 2, 2009

(51) Int. Cl.
*G03F 3/08* (2006.01)

(52) U.S. Cl. ........ 358/523; 358/1.9; 358/3.26; 358/504; 358/518; 358/538

(58) Field of Classification Search ............ 358/1.1–1.2, 358/1.9, 3.26–3.27, 504, 538
See application file for complete search history.

(56) References Cited

U.S. PATENT DOCUMENTS

| | | | |
|---|---|---|---|
| 5,589,948 A | | 12/1996 | Itezono |
| 5,625,391 A * | 4/1997 | Hirabayashi et al. ............ 347/41 |
| 5,644,411 A * | 7/1997 | Tamagaki et al. ............. 358/529 |
| 5,966,461 A * | 10/1999 | Harrington .................... 382/167 |
| 6,417,932 B1 * | 7/2002 | Hirota et al. .................... 358/1.2 |
| 6,629,746 B2 * | 10/2003 | Waldner et al. ................. 347/19 |
| 6,654,143 B1 * | 11/2003 | Dalal et al. ..................... 358/1.9 |
| 6,980,328 B2 * | 12/2005 | Hudson ......................... 358/1.9 |
| 7,114,790 B2 * | 10/2006 | Seki et al. ......................... 347/5 |
| 7,609,894 B2 | 10/2009 | Zaklika et al. |
| 7,675,659 B2 | 3/2010 | Ogatsu et al. |
| 7,684,077 B2 * | 3/2010 | Maeda ......................... 358/1.18 |
| 2006/0077488 A1 | 4/2006 | Zhang et al. |
| 2006/0077489 A1 * | 4/2006 | Zhang et al. .................. 358/504 |
| 2007/0146742 A1 | 6/2007 | Klassen |
| 2007/0291289 A1 * | 12/2007 | Kuo et al. ...................... 358/1.9 |

FOREIGN PATENT DOCUMENTS

| | | |
|---|---|---|
| JP | 05-110839 A | 4/1993 |
| JP | 2004072220 | 3/2004 |

* cited by examiner

*Primary Examiner* — Richard Zhu
(74) *Attorney, Agent, or Firm* — Chen Yoshimura LLP

(57) ABSTRACT

A method for compensating for color variations introduced by printer hardware limitations and other factors is described. First, for each printer model or each individual printer, the extent of color variation throughout a printed page is determined. Based on this determination, each page is partitioned into a plurality of image areas. Then, in an actual printing process, the page of image is printed in a multi-pass process where each image area is printed in a separate pass. The digital image data is shifted and/or rotated for each pass, and the paper is shifted and/or rotated correspondingly, so that the different image areas printed in different passes form a complete image on the final printed page. From the standpoint of the pointer hardware, all passes involve printing the same area of a physical page, resulting in reduced color variation across the page.

8 Claims, 4 Drawing Sheets

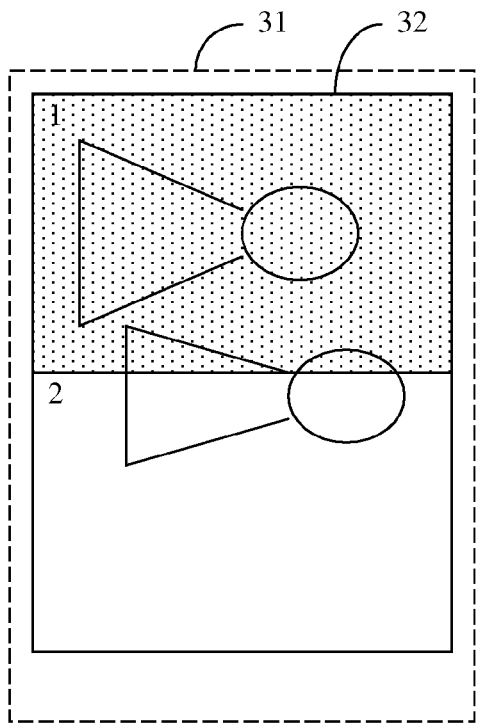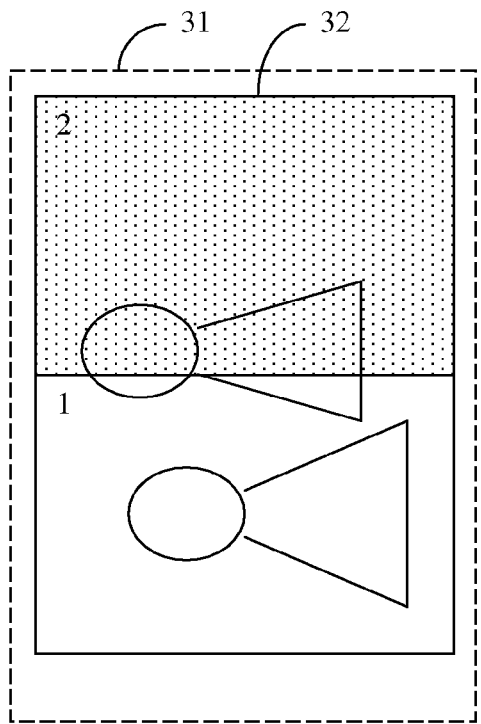
Fig. 4a　　　　　　　　　　Fig. 4b
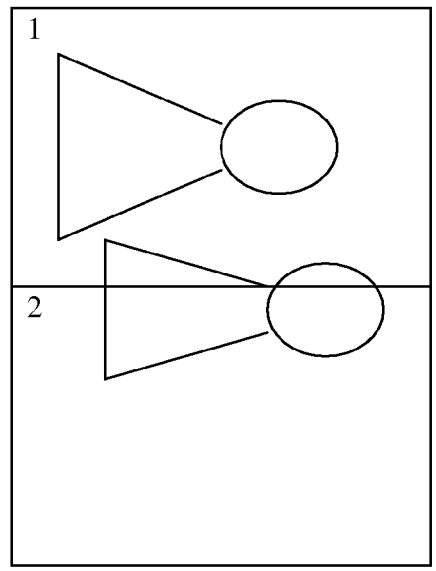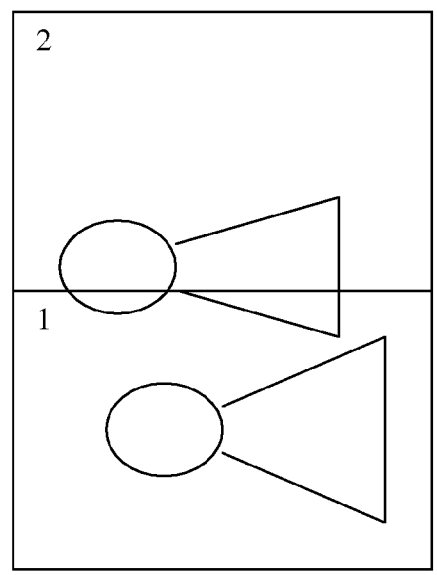
Fig. 4c　　　　　　　　　　Fig. 4d

METHOD FOR COMPENSATING FOR COLOR VARIATIONS ACROSS A PRINTED PAGE USING MULTIPLE-PASS PRINTING This application is related to commonly owned patent application entitled "Method for Compensating for Color Variations Across a Printed Page Using Multiple Color Profiles," application Ser. No. 11/865,019, filed Sep. 30, 2007, now pending.

BACKGROUND OF THE INVENTION

1. Field of the Invention

This invention relates to a printing method and related apparatus, and in particular, it relates to a printing method and apparatus that compensate for color variations across a printed page caused by printer hardware limitations and precision of assembly of machine parts.

2. Description of Related Art

Due to hardware limitations and precision of assembly of machine parts, a printer is often unable to generate colors uniformly throughout a page, and as a result color variations across the page are often observed in a printed page of image. For example, the same color (i.e. color having the same values in the input digital image data) printed in an upper portion of the page and in a lower portion of the page may appear to be slightly different. In other word, the printer has different color characteristics in different portions of a physical page. This is especially the case for larger format printers, such as printers that can print pages of 11×17 inches or larger.

SUMMARY

The present invention is directed to a method and related apparatus for compensating for color variations introduced by printer hardware limitations and precision of assembly of machine parts.

An object of the present invention is to generate printed pages with reduced color variation throughout the page.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for reducing color variation across a page of image printed by a printer, which includes: (a) printing a page of engine test chart using the printer; (b) measuring the printed engine test chart to obtain color values at different locations of the page; (c) based on the measured color values, determining a page partition for dividing the page into two or more image areas; and (d) storing the page partition in the printer.

In another aspect, the present invention provides a method for printing a page of image using a printer, which includes: (a) receiving a page of digital image data to be printed; (b) retrieving page partition information stored in the printer, the page partition information specifying, for each of one or more paper sizes, a partition of a page into two or more image areas; (c) detecting a paper size of the page of image to be printed; (d) dividing the page of image to be printed into two or more image areas based on the detected paper size and the retrieved page partition information; and (e) printing the two or more image areas on a medium, including: (e1) printing a first image area on a medium; (e2) rotating and/or shifting the digital image data so that a second image area is located in a same area on the page as the first image area is originally located; (e3) rotating and/or shifting the medium corresponding to the rotation and/or shift of the digital image data in step (e2); (e4) printing the second image area on the medium; and (e5) repeating steps (e2) to (e4) for any additional image areas.

In another aspect, the present invention provides a printer which includes: a print engine including a document feeding path; and a controller for processing digital image data to be printed and controlling the print engine, the controller including a processor and a memory; wherein the memory stores page partition information which specifies, for each of one or more paper sizes, a partition of a page into two or more image areas, and wherein the controller is programmed to control the print engine to carryout the above printing process.

It is to be understood that both the foregoing general description and the following detailed description are exemplary and explanatory and are intended to provide further explanation of the invention as claimed.

BRIEF DESCRIPTION OF THE DRAWINGS

FIGS. 4a-4d illustrate another example of a multiple-pass printing using image rotation.

DETAILED DESCRIPTION OF PREFERRED EMBODIMENTS

Embodiments of the present invention provide a method for compensating for color variations across a printed page introduced by printer hardware limitations and precision of assembly of machine parts. First, for each printer model or each individual printer, the extent of color variation throughout a printed page is determined. Based on this determination, each page is partitioned into a plurality of image areas. Then, in an actual printing process, the page of image is printed in a multiple-pass process where each image area is printed in a separate pass. The digital image data is shifted and/or rotated for each pass, and the printing medium (e.g. paper) is shifted and/or rotated correspondingly, so that the different image areas printed in different passes form a complete image on the final printed page.

In a simple example, the paper is fed in a direction parallel to its long edge, and each page is partitioned into two image areas, an upper half and a lower half ("up" being the paper feeding direction). The upper half is printed in the first pass. Then, the digital image data is shifted so that the lower half of the image is now located at the upper half of the page. In the second pass, the paper is shifted upwards by half a page (e.g. by controlling the document feeding path of the printer), and the upper half of the shifted digital image is printed. Thus, from the standpoint of the printer, in both passes, the upper half of an image is printed. Accordingly, both halves of the printed image reflect the color characteristics associated with the same portion (the upper half) of the physical page. As a result, color variation between the two printed halves is reduced.

Figure 1:
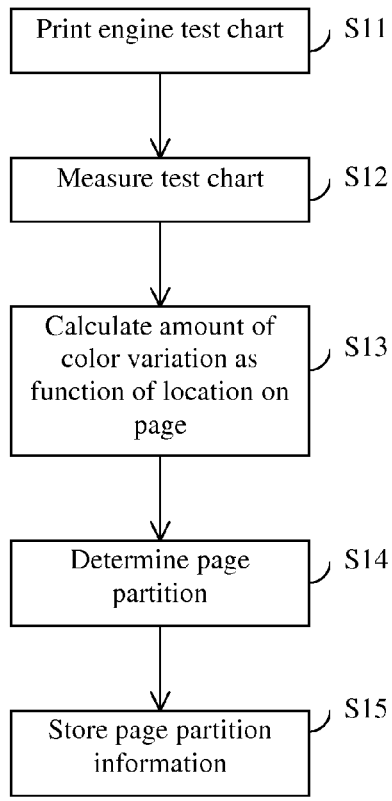
FIG. 1 illustrates a process for determining page partition for a printer or printer model according to an embodiment of the present invention.

Embodiments of the present invention are explained in more detail with reference to FIGS. 1 and 2. FIG. 1 illustrates a process of determining how a page is to be partitioned into a plurality of areas for a printer. First, a page of engine test chart is printed using the printer (step S11). The engine test chart is a chart that has a plurality of color patches repeated throughout the page. A printer typically provides a default engine test chart that can be readily printed. Then, the printed engine test chart is measured to obtain color values at different locations of the page (step S12). Preferably, a special purpose spectrometer for measuring printed colors is used for this measurement, but other suitable apparatus may be used too. An amount of color variation, such as color difference or density difference, is calculated for various locations throughout the page (step S13). In one example, the amount of color variation is the difference between the measured color values and design target values specified by the manufacture. In another example, the amount of color variation is the difference between the measured color values at each location of the page relative to a predetermined point on the page (e.g. the center, the upper-left hand corner, etc.). Based on the amount of color difference as a function of location, the page is partitioned into multiple image areas (step S14). This step may be performed manually. For example, if the calculation shows that the amount of color variation is relatively large in the paper (medium) feeding direction, but relatively small in the transverse direction (the direction perpendicular to the paper feeding direction), the page may be partitioned into two (or more) areas in the paper feeding direction but not partitioned in the transverse direction. Of course, other factors may be considered in determining the partition, such as convenience, printing speed, etc. The page partition information is then stored in the printer (step S15) for future use.

In addition, the partition will typically depend on the page size. (Here, paper size includes orientation. For example, a letter sized paper in the portrait orientation may be considered 8.5 by 11 inches, whereas a letter sized paper in the landscape orientation may be considered 11 by 8.5 inches.) In one embodiment, steps S11 to S14 is repeatedly performed for each of a number of standard paper sizes, and in step S15 the page partition information for various paper sizes is stored in the printer for future use.

In an alternative embodiment, steps S11 to S14 are performed for the full printable area of the printer. For example, if the full printable area for the printer is 17×11 inches, an engine test chart of 17×11 inches is printed and measured. Then the page partition for this full printable are is determined and stored in the printer for future use.

Experiments with certain classes of printers suggest that for letter or A4 sized pages, when paper feeding is in the direction of the long edge of the paper, a partition into two areas along the long edge and no partition along the short edge is generally adequate.

The partition process illustrated in FIG. 1 may be carried out during the manufacturing process. Alternatively, or in addition, the partition process illustrated in FIG. 1 may be performed by the user from time to time, as the color characteristics of the printer may shift slowly over time. Further, the process may be performed for each model of printers by the manufacturer if it is determined that the hardware limitations and other factors causing color variation are relatively consistent within each printer model. Alternatively, the process may be performed for each individual printer.

Figure 2:
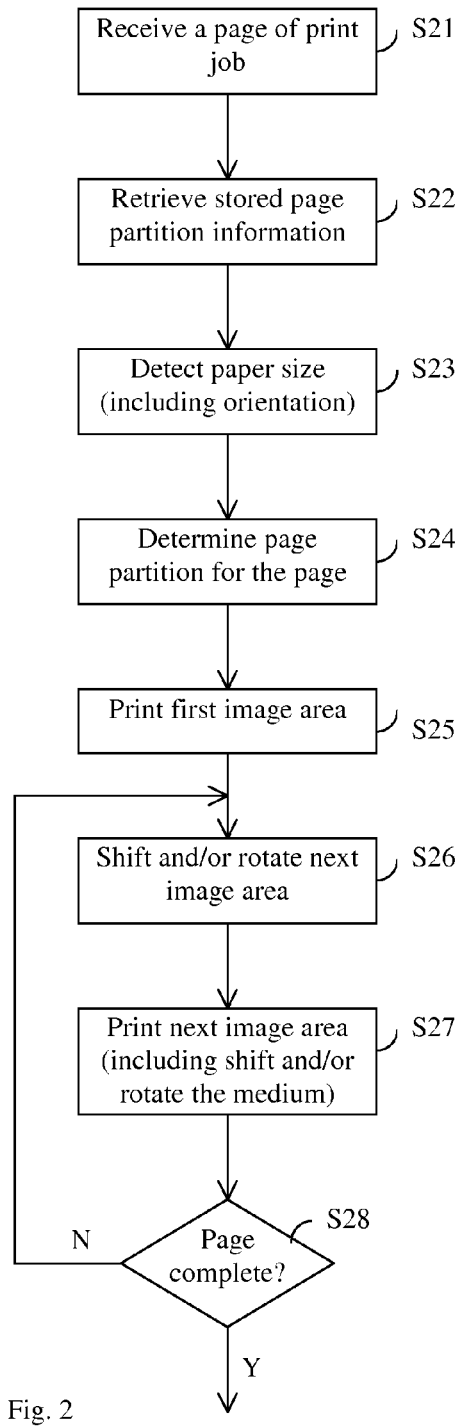
FIG. 2 illustrates a multiple-pass printing process that reduces color variations across a printed page according to an embodiment of the present invention.

FIG. 2 shows a process carried out by a printer when printing a page of image using a multiple-pass process. When a page of print job is received (step S21), the printer retrieves the previously stored page partition information (step S22), and detects the paper size (including orientation) of the page to be printed (step S23). Based on this information, the printer determines the page partition for the current page to be printed and divides the page into two or more image areas (step S24). When the page partition information is stored for various standard paper sizes, step S24 can be done by selecting the stored page partition corresponding to a paper size that matches (or most closely matches) the detected paper size. When the page partition information is stores in the form of a page partition for the full printable area of the printer, the printer control will determined the page partition for the current page by comparing the current page size with the size of the full printable area. For example, if the full printable area is 17×11 inches and is partitioned into 2×2 image areas, and the current paper size is 8.5×11 inches, then the current page will be partitioned into two image areas along the long (11-inch) edge.

The printer then carries out a multiple-pass printing process to print the page (steps S25 to S28). Specifically, the first image area is printed (step S25), and the digital image data is shifted and/or rotated so that the second image area is now located in the same area on the page as the first image area in the original image (step S26). The second image area (after being shifted and/or rotated) is printed (step S27), with the print medium (e.g. paper) being shifted and/or rotated in the same way as the image area. The image shifting/rotating step (steps S26) and the printing step (step S27) are repeated until all image areas of the page are printed and the page is complete ("Y" in step S28).

Most printers currently cannot rotate paper automatically. Thus, if any paper rotation is required in step S27, manual handling will be required for such printers. In so, the printer may display instructions for the operator to manually rotate the paper. Unless specifically noted, all steps shown in FIG. 2 are performed automatically by the printer under control of the printer controller.

Figure 3A:
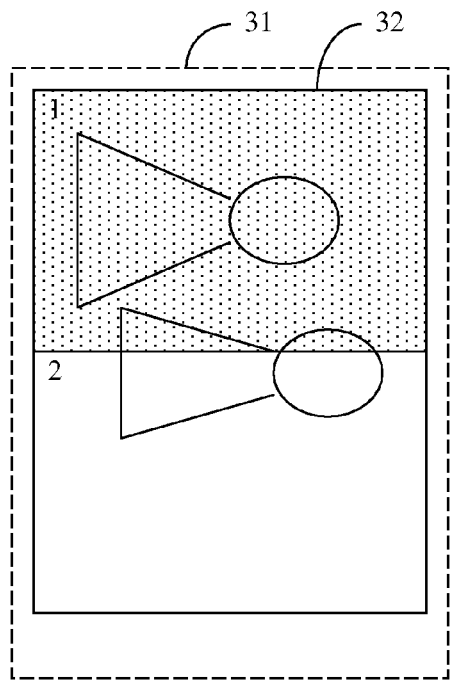
FIGS. 3a-3d illustrate one example of a multiple-pass printing using image shifting.
Figure 3B:
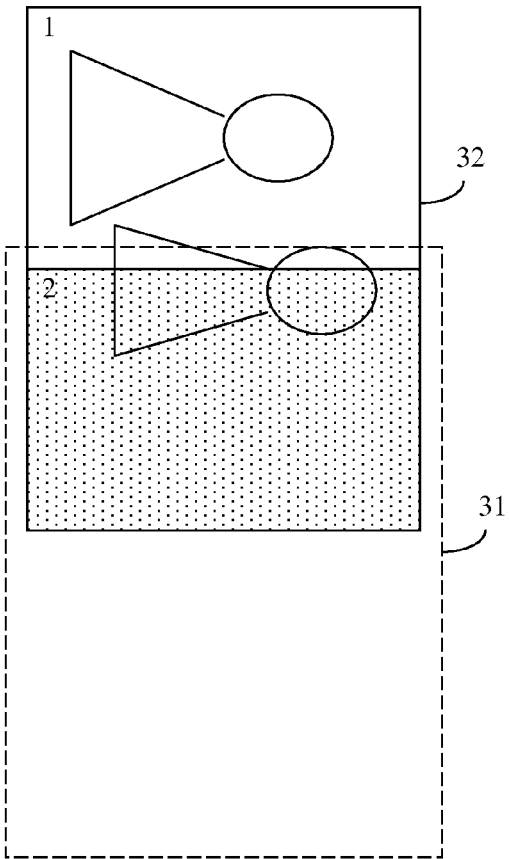
Figure 3C:
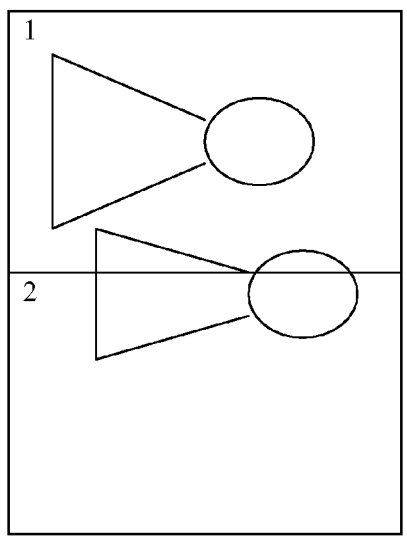
Figure 3D:
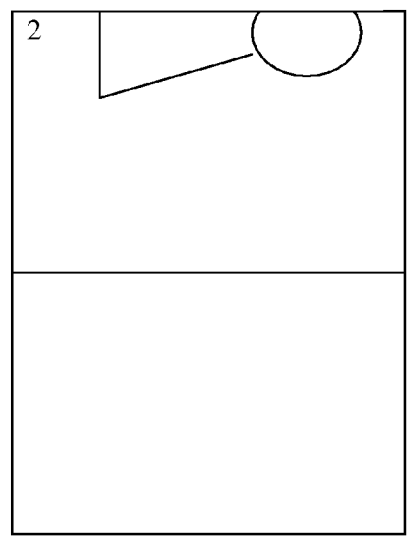

As mentioned earlier, a simple example of partitioning a letter sized page is to divide the page into two image areas in the long direction of the paper, with the paper being fed along the its long direction. The second image area and the paper are simply shifted by half a page. The shifting of the paper is achieved by the paper feeding mechanism of the printer. High-end printers can typically control the feeding sufficiently precisely so that the two image areas are registered precisely and the printed image appears continuous. FIGS. 3a-3d illustrate this example. FIG. 3a illustrates the first pass (printing of the first image area 1) and FIG. 3b illustrates the second pass (printing of the second image area 2). The dashed line area 31 indicates a physical area defined by the printer, and the shaded areas are the areas printed in each pass. The area 32 represents the paper. FIG. 3c illustrates the original digital image before any shifting, and FIG. 3d illustrates the digital image after the second image area is shifted upwards by half a page. Alternatively, the image may be rotated by 180 degrees around a center point of the page, and the paper is rotated in the same way. FIGS. 4a to 4d illustrate this example. FIGS. 4a and 4b illustrate the two printing passes, and FIGS. 4c and 4d illustrate the digital image data before and after the rotation. Shifting along the paper feeding direction is generally preferred to rotation because a shift can normally be done automatically and a rotation will typically require manual handling of the paper.

Shifting the paper in the transverse direction (the direction perpendicular to the paper feeding direction) by a precise amount may or may not be possible on a given printer, depending on the design of the printer's paper transport system, the paper size, the amount of required shift, etc. When a partition requires dividing a page in the transverse direction by two, all image areas can be printed by a combination of 180-degree rotations and shifting in the paper feeding direction without requiring shifting in the transverse direction. For such partitions, multiple pass printing can be accomplished even if the printer cannot handle transverse shifting. For example, if the page is divided into four quadrants, the paper feeding direction being "up", the four printing passes can be done as follows: (1) upper-left quadrant: no shift or rotation; (2) lower-left quadrant: shift image upwards by half a page, no rotation; (3) lower-right quadrant: rotate image around the page center by 180 degrees, no shift; and (4) upper-right quadrant: rotate image around the page center by 180 degrees then shift upward by half a page. (Note that the above shift and rotation are with respect to the original image.) If a printer cannot rotate the paper automatically, manually rotating the paper will be required.

Figure 5:
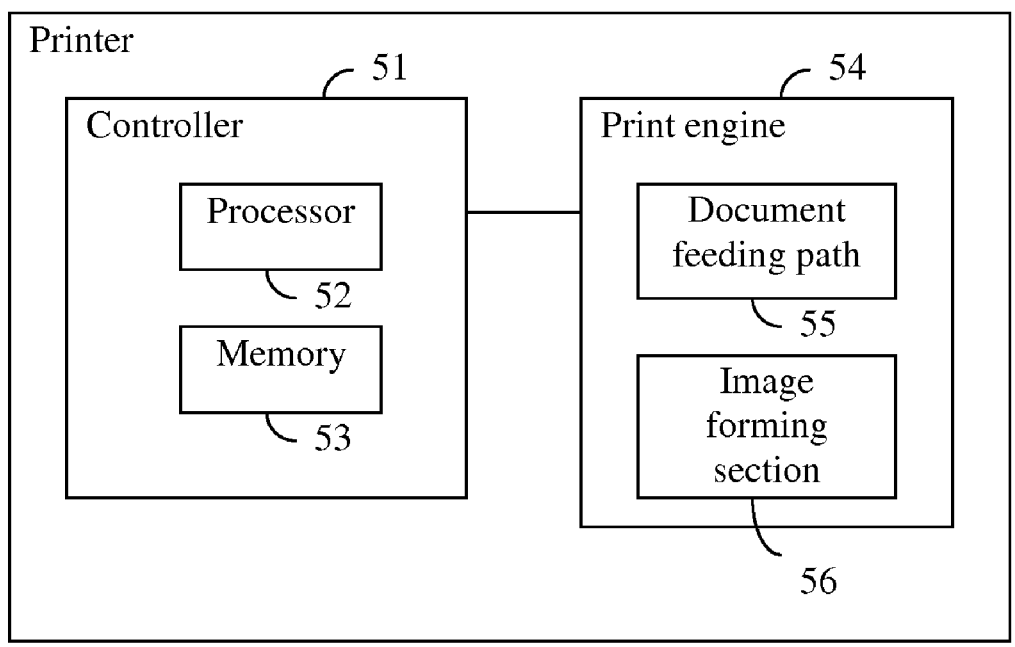
FIG. 5 schematically illustrates a printer on which a printing method according to embodiments of the present invention may be implemented.

FIG. 5 is a schematic block diagram of a printer in which methods according to embodiments of the present invention may be implemented. The printer includes a controller 51 which includes a processor 52 and a memory 53, and a print engine 54 which includes a document feeding path 55 and an image forming section 56. Other portions of the printer are not shown. The memory 53 stores the page partition information. The image shifting and rotation is performed by the processor 52. The controller 51 controls the print engine 54 and implements the printing method described above. The structures of the print engine are familiar to those skilled in the printer art and will not be described here.

It will be apparent to those skilled in the art that various modification and variations can be made in the color variation compensation method and apparatus of the present invention without departing from the spirit or scope of the invention. Thus, it is intended that the present invention cover modifications and variations that come within the scope of the appended claims and their equivalents.

What is claimed is:

1. A method for printing a page of image using a printer, comprising:
    (a) printing a page of engine test chart having a paper size using the printer;
    (b) measuring the printed engine test chart to obtain color values at different locations of the page;
    (c) based on the measured color values and without regard to image attributes of any image to be printed later, determining a page partition for dividing all pages of images to be printed later which have the paper size into two or more image areas;
    (d) storing the page partition in the printer;
    repeating steps (a) to (d) for additional paper sizes;
    after steps (a) to (d),
    (e) receiving a page of digital image data to be printed;
    (f) retrieving stored page partition information for a plurality of paper sizes;
    (g) detecting a paper size of the page of image to be printed;
    (h) dividing the page of image to be printed into two or more image areas based on the detected paper size and the retrieved page partition information; and
    (i) printing the two or more image areas on a medium, including:
        (i1) printing a first image area on a medium;
        (i2) after step (i1), rotating and/or shifting the digital image data so that a second image area is located in a same area on the page as the first image area is originally located;
        (i3) rotating and/or shifting the medium corresponding to the rotation and/or shift of the digital image data in step (i2);
        (i4) after the rotating and/or shifting steps of (i2) and (i3), printing the second image area which has been rotated and/or shifted by step (i2) on the medium which has been rotated and/or shifted by step (i3); and
        (i5) repeating steps (i2) to (i4) for any additional image areas.

2. The method of claim 1, wherein step (c) includes calculating an amount of color variation for a plurality of locations on the page.

3. The method of claim 1, wherein steps (a) through (c) are performed for a full printable area of the printer.

4. The method of claim 1, wherein in step (h), the page of image is divided into two image areas along a medium feeding direction of the printer, wherein step (i2) includes shifting the image in the medium feeding direction by half of the page, and wherein step (i3) includes shifting the medium in the medium feeding direction by half of the page.

5. A printer, comprising:
    a print engine including a document feeding path; and
    a controller for processing digital image data to be printed and controlling the print engine, the controller including a processor and a memory;
    wherein the memory stores page partition information which specifies, for each of a plurality of paper sizes, a partition of all pages of images to be printed which have the paper size into two or more image areas, the partition for each paper size having been obtained by printing a page of engine test chart having the paper size using the printer, measuring the printed engine test chart to obtain color values at different locations of the page of engine test chart, and determining the partition based on the measured color values and without regard to image attributes of any image to be printed, and
    wherein the controller is programmed to control the print engine to carry out a printing process which includes:
        (a) receiving a page of digital image data to be printed;
        (b) retrieving page partition information stored in the memory;
        (c) detecting a paper size of the page of image to be printed;
        (d) dividing the page of image to be printed into two or more image areas based on the detected paper size and the retrieved page partition information; and
        (e) printing the two or more image areas on a medium, including:
            (e1) printing a first image area on a medium;
            (e2) after step (e1), rotating and/or shifting the digital image data so that a second image area is located in a same area on the page as the first image area is originally located;
            (e3) rotating and/or shifting the medium corresponding to the rotation and/or shift of the digital image data in step (e2);
            (e4) after the rotating and/or shifting steps of (e2) and (e3), printing the second image area which has been rotated and/or shifted by step (e2) on the medium which has been rotated and/or shifted by step (e3); and
            (e5) repeating steps (e2) to (e4) for any additional image areas.

6. The printer of claim 5, wherein in step (d), the page of image is divided into two image areas along a medium feeding direction of the printer, wherein step (e2) includes shifting the image in the medium feeding direction by half of the page, and wherein step (e5) includes shifting the medium in the medium feeding direction by half of the page.

7. The method of claim 1, wherein the page partition defines partial areas of multiple prints in a multiple-pass process.

8. The method of claim 1, wherein in step (c), the page partition divides the page into two or more image areas in a paper feeding direction, or divides the page into two or more image areas in a direction perpendicular to the paper feeding direction.

* * * * *